(12) United States Patent
Werner et al.

(10) Patent No.: US 11,888,402 B2
(45) Date of Patent: Jan. 30, 2024

(54) CONTROLLER FOR MULTI-OUTPUT SINGLE MAGNETIC COMPONENT CONVERTER

(71) Applicant: POWER INTEGRATIONS, INC., San Jose, CA (US)

(72) Inventors: Antonius Jacobus Johannes Werner, Cambridge (GB); Matthew David Waterson, Bottisham (GB); Yuncong Alex Jiang, Santa Clara, CA (US); Roland Sylvere Saint-Pierre, San Jose, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 0 days.

(21) Appl. No.: 17/983,942

(22) Filed: Nov. 9, 2022

(65) Prior Publication Data

US 2023/0081920 A1    Mar. 16, 2023

Related U.S. Application Data

(63) Continuation of application No. 17/085,742, filed on Oct. 30, 2020, now Pat. No. 11,539,298, which is a
(Continued)

(51) Int. Cl.
*H02M 3/335* (2006.01)
*H02M 1/08* (2006.01)
(Continued)

(52) U.S. Cl.
CPC ......... *H02M 3/33561* (2013.01); *H02M 1/08* (2013.01); *H02M 3/33592* (2013.01);
(Continued)

(58) Field of Classification Search
None
See application file for complete search history.

(56) References Cited

U.S. PATENT DOCUMENTS 5,291,386 A    3/1994  Wu
5,363,323 A   11/1994  Lange
(Continued)

FOREIGN PATENT DOCUMENTS

CN         1602579 A    3/2005
CN       102625525 A    8/2012
(Continued)

OTHER PUBLICATIONS

U.S. Appl. No. 16/951,156, Final Office Action dated Mar. 17, 2022; 11 pages.
(Continued)

*Primary Examiner* — Crystal L Hammond
(74) *Attorney, Agent, or Firm* — Karina Martha G. Li; Power Integrations, Inc.

(57) ABSTRACT

A control system for use in a power converter having a plurality of outputs comprising a primary switching control block, a secondary control block, and a multi-output control block. The primary switching control block is coupled to control switching of a primary switch. The secondary control block is coupled to control switching of a synchronous rectifier switch. The multi-output control block is coupled to control switching of at least one pulse transfer switch coupled to one of the plurality of outputs. A request for an energy pulse is transferred to the primary switching control block to turn ON the primary switch to transfer the energy pulse to one of the plurality of outputs. The multi-output control block comprises an interface to send the request for the energy pulse and to receive an acknowledge signal to and from the secondary control block.

28 Claims, 10 Drawing Sheets

Related U.S. Application Data continuation of application No. 16/363,258, filed on Mar. 25, 2019, now Pat. No. 10,855,191, which is a continuation of application No. 15/607,075, filed on May 26, 2017, now Pat. No. 10,277,136.

(60) Provisional application No. 62/428,962, filed on Dec. 1, 2016.

(51) Int. Cl.
  *H05B 45/10* (2020.01)
  *H05B 45/46* (2020.01)
  *H05B 45/385* (2020.01)
  *H05B 45/37* (2020.01)
  *H02M 1/00* (2006.01)

(52) U.S. Cl.
  CPC .............. *H05B 45/10* (2020.01); *H05B 45/37* (2020.01); *H05B 45/385* (2020.01); *H05B 45/46* (2020.01); *H02M 1/0025* (2021.05); *H02M 1/0043* (2021.05); *Y02B 70/10* (2013.01)

(56) References Cited

U.S. PATENT DOCUMENTS

| | | | |
|---|---|---|---|
| 5,414,610 A | 5/1995 | Brainard | |
| 5,602,726 A | 2/1997 | Sakai | |
| 5,864,472 A | 1/1999 | Peterson | |
| 5,973,941 A | 10/1999 | Zaim | |
| 6,037,832 A * | 3/2000 | Kaminishi | H01S 5/06804 327/513 |
| 6,081,438 A | 6/2000 | Saint-Pierre et al. | |
| 6,304,461 B1 | 10/2001 | Walker | |
| 6,434,026 B1 | 8/2002 | Malik et al. | |
| 6,504,267 B1 | 1/2003 | Giannopoulos | |
| 6,549,432 B1 | 4/2003 | Giannopoulos et al. | |
| 6,552,917 B1 | 4/2003 | Bourdillon | |
| 7,304,867 B2 | 12/2007 | Usui | |
| 7,505,288 B2 | 3/2009 | Duvnjak | |
| 7,595,624 B2 | 9/2009 | Tateishi et al. | |
| 7,649,280 B2 | 1/2010 | Madigan | |
| 7,679,937 B2 | 3/2010 | Wingrove et al. | |
| 7,906,868 B2 | 3/2011 | Ferguson et al. | |
| 7,923,943 B2 | 4/2011 | Peker et al. | |
| 8,085,031 B2 | 12/2011 | Mast et al. | |
| 8,233,291 B2 | 7/2012 | Lin et al. | |
| 8,772,909 B1 | 7/2014 | Vinciarelli | |
| 9,246,392 B2 | 1/2016 | Balakrishnan et al. | |
| 9,379,580 B2 | 6/2016 | Barkley | |
| 9,491,815 B2 | 11/2016 | Jin | |
| 9,548,662 B2 | 1/2017 | Hosotani | |
| 9,621,048 B2 | 4/2017 | Hosotani et al. | |
| 9,806,623 B2 | 10/2017 | Grosso et al. | |
| 9,839,082 B2 | 12/2017 | Jin | |
| 9,906,139 B2 | 2/2018 | Huang et al. | |
| 10,218,282 B1 | 2/2019 | Moore et al. | |
| 2002/0141206 A1 | 10/2002 | Brkovic | |
| 2004/0046536 A1 | 3/2004 | Librizzi | |
| 2004/0257838 A1 | 12/2004 | Gan et al. | |
| 2006/0125320 A1 | 6/2006 | Namba et al. | |
| 2007/0121350 A1 | 5/2007 | Duvnjak | |
| 2009/0141521 A1 | 6/2009 | Yang | |
| 2009/0179491 A1* | 7/2009 | Ferguson | H02M 3/3353 307/31 |
| 2009/0212758 A1 | 8/2009 | Asinovski et al. | |
| 2009/0322257 A1 | 12/2009 | Kim et al. | |
| 2010/0283322 A1 | 11/2010 | Wibben | |
| 2011/0051469 A1 | 3/2011 | Cyr | |
| 2012/0075891 A1 | 3/2012 | Zhang et al. | |
| 2013/0033902 A1 | 2/2013 | Zhang | |
| 2013/0250622 A1 | 9/2013 | Hosotani et al. | |
| 2014/0009086 A1 | 1/2014 | Saint-Pierre | |
| 2014/0204625 A1 | 7/2014 | Liu et al. | |
| 2015/0002042 A1 | 1/2015 | Kim et al. | |
| 2015/0015071 A1 | 1/2015 | Deboy et al. | |
| 2015/0035450 A1 | 2/2015 | Werner | |
| 2015/0091463 A1* | 4/2015 | Jin | H05B 45/315 315/201 |
| 2015/0130516 A1 | 5/2015 | Asai et al. | |
| 2016/0141961 A1 | 5/2016 | Odell et al. | |
| 2016/0359420 A1 | 12/2016 | Chen | |
| 2016/0365794 A1 | 12/2016 | Lawson et al. | |
| 2017/0041995 A1 | 2/2017 | Jin | |
| 2018/0351463 A1 | 12/2018 | Werner et al. | |
| 2020/0313561 A1 | 10/2020 | Moore et al. | |

FOREIGN PATENT DOCUMENTS

| | | | |
|---|---|---|---|
| DE | 4410211 A1 | 10/1995 | |
| JP | 2005512486 A | 4/2005 | |
| JP | 2006147355 A | 6/2006 | |
| JP | 2009188135 A | 8/2009 | |
| JP | 2009303421 A | 12/2009 | |
| JP | 2010263739 A | 11/2010 | |
| JP | 2012160321 A | 8/2012 | |
| JP | 2013502689 A | 1/2013 | |
| TW | 214616 B | 10/1993 | |
| TW | 200941906 A | 10/2009 | |
| WO | 2014017312 A1 | 1/2014 | |

OTHER PUBLICATIONS

Chinese Application No. 201711241839.4; "Notification to Grant Patent Right for Invention with Translation"; dated Oct. 13, 2021; 3 pages.
Chinese Office Action and Translation dated Sep. 27, 2020 in Chinese Patent Application No. 201711241839.4, 17 pages.
Chinese Office Action dated Sep. 27, 2020 in Chinese Patent Application No. 201711241839.4, 7 pages in all.
Chinese Search Report dated Sep. 20, 2020 in Chinese Patent Application No. 2017112418394, 2 pages in all.
U.S. Appl. No. 17/085,742, "Notice of Allowance and Fee(s) Due," dated Sep. 8, 2022, 7 pages.
Chinese Second Office Action; Application No. 201711241839.4; dated May 14, 2021; 6 pages.
European Patent Application No. 21207495.9, Extended European Search Report dated Apr. 4, 2022; 8 pages.
India Examination Report dated Sep. 30, 2019, for Indian Patent Application No. 201714041259; 7 pages in all.
International Patent Appl. No. PCT/US2020/024403; International Search Report and Written Opinion dated Jul. 8, 2020; 13 pages.
International Patent Application No. PCT/US2017/034828-International Search Report and Written Opinion dated Aug. 2, 2017, 11 pages.
Japanese Application No. P2017-225266, Notice of Reasons for Refusal with Translation; dated Jul. 1, 2021; 12 pages.
Japanese Application No. P2017-225266, Decision of Refusal with Translation; dated Nov. 4, 2021; 17 pages.
Japanese Application No. P2017-225266, Decision to Grant a Patent; dated Apr. 21, 2022; 9 pages.
Korean Patent Application No. 2017-164584; "Notification of Reason for Refusal;" dated Jan. 26, 2022; 7 pages.
Machine Translation of Chinese Second Office Action; Application No. 201711241839.4; dated May 14, 2021; 9 pages.
Taiwanese Appl. No. 106141546; First Office Action with EN Translation; dated Mar. 12, 2021; 17 pages.

* cited by examiner

An Example option of sequential energy transfer when all outputs have simultaneous demand

CONTROLLER FOR MULTI-OUTPUT SINGLE MAGNETIC COMPONENT CONVERTER

CROSS-REFERENCE TO RELATED APPLICATIONS

This application is a continuation of U.S. patent application Ser. No. 17/085,742, filed on Oct. 30, 2020 and currently pending, which is a continuation of U.S. patent application Ser. No. 16/363,258, filed on Mar. 25, 2019 and issued as U.S. Pat. No. 10,855,191 on Dec. 1, 2020, which is a continuation of U.S. patent application Ser. No. 15/607,075, filed on May 26, 2017 and issued as U.S. Pat. No. 10,277,136 on Apr. 30, 2019, which claims the benefit of U.S. Provisional Application No. 62/428,962, filed on Dec. 1, 2016. U.S. patent application Ser. No. 17/085,742, U.S. patent application Ser. No. 16/363,258, U.S. patent application Ser. No. 15/607,075 and U.S. Provisional Application No. 62/428,962 are incorporated herein by reference in their entirety.

TECHNICAL FIELD

This application relates generally to switch mode power supplies and more specifically the invention relates to multi output converters with regulated constant current and constant voltage outputs powering electronic circuits.

BACKGROUND

Power converters with multiple output and constant current (CC) and/or Constant Voltage (CV) control are of interest and widely used due to their benefits in cost, volume and efficiency in applications that require various levels of the regulated output voltages in CV mode as well as the controlled regulated current in CC mode. The multiple outputs are applied over multiple loads and are independently controlled based on each output load demand controlled and regulated.

In most of the multiple output converters developed so far only one output may tightly be regulated. They may require multiple secondary windings and magnetic components to be regulated independently that would increase cost and size of the power converter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
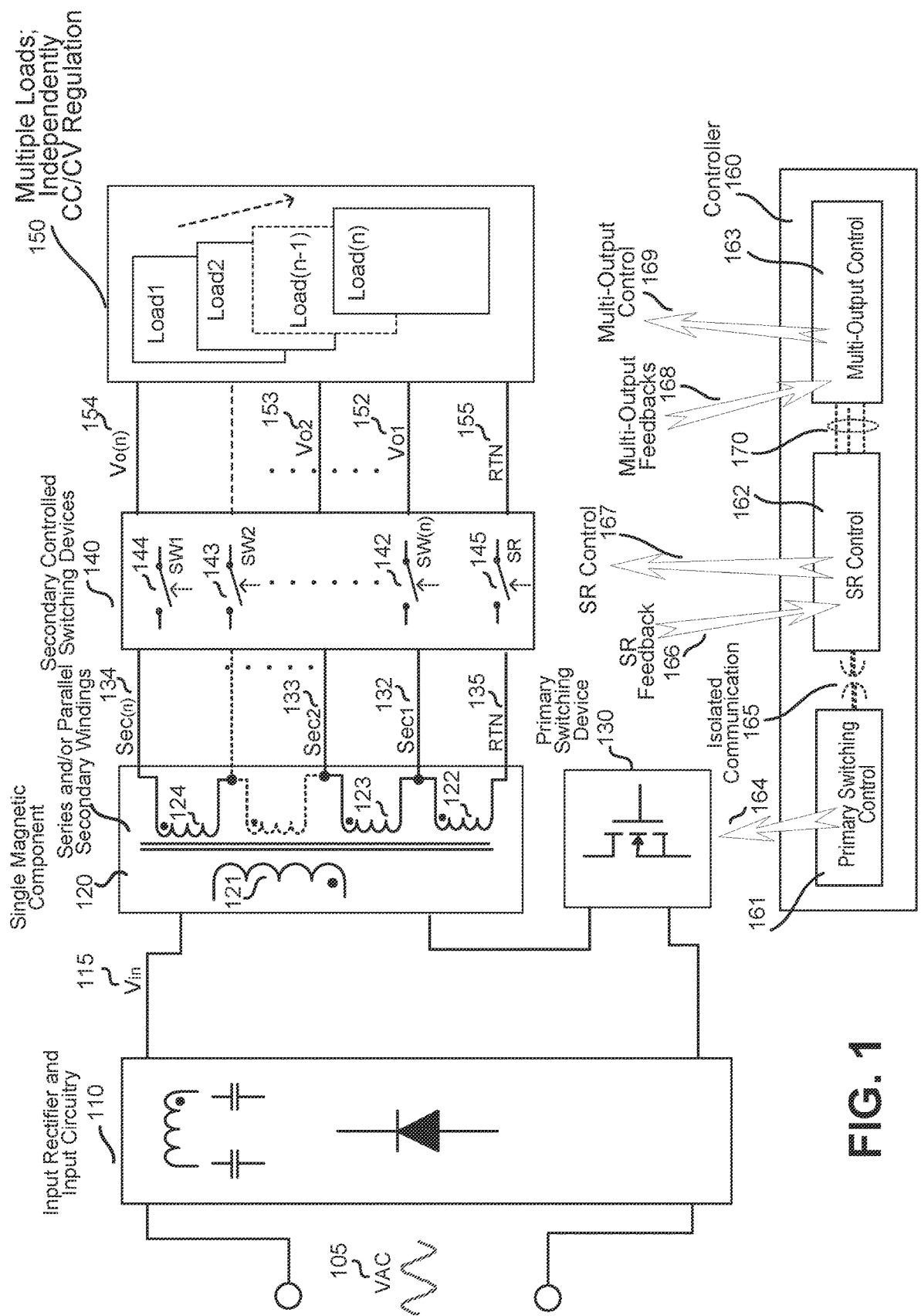
FIG. 1 shows general structure and circuit blocks of an example power converter with a single magnetic component and multi-outputs that in one example may be coupled to independently regulated constant current and constant voltage loads.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, specific details are set forth, such as device types, voltages, component values, circuits, etc., in order to provide a thorough understanding of the embodiments described. However, persons having ordinary skill in the relevant arts will appreciate that these specific details may not be needed to practice the embodiments described. It is further appreciated that well-known circuit structures and elements have not been described in detail, or have been shown in block diagram form, in order to avoid obscuring the embodiments described.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art.

In the context of the present application, when a transistor is in an "off-state" or "off" the transistor does not substantially conduct current. Conversely, when a transistor is in an "on-state" or "on" the transistor is able to substantially conduct current. By way of example, in one embodiment, a high-voltage transistor comprises an N-channel metal-oxide-semiconductor field-effect transistor (NMOS) with the high-voltage being supported between the first terminal, a drain, and the second terminal, a source. The high voltage MOSFET comprises a power switch that is driven by an integrated controller circuit to regulate energy provided to a load. For purposes of this disclosure, "ground" or "ground potential" refers to a reference voltage or potential against which all other voltages or potentials of an electronic circuit or Integrated circuit (IC) are defined or measured.

A multi output with secondary-side Constant Current (CC) and Constant Voltage (CV) controller for electronic appliance applications is disclosed. It integrates independent CC/CV regulations wherein CV outputs include precision reference voltages and CC outputs may include adjustable load current. In one example application, the CC output may be used for dimmable LED strings (e.g., arrays) of a monitor screen (e.g., a TV monitor device with LED strings and an adjustable dimming current). Control Loops in the controller provide precise and independent regulation of CC and CV outputs.

The multi-output CC/CV independent control may use a Time Slot Power Distribution Control (TSPDC) process to regulate all the outputs in high precision in an optimized timing.

The proposed converter topology in one example is a single stage multi-output flyback converter targeting applications with multiple independently regulated constant voltage and/or constant current outputs. Example targets for such products may include monitor and TV applications, which include a CC controlled output for the parallel strings (e.g., arrays) of backlight LEDs requiring regulated adjustable (e.g., dimming) constant current output with for example a 40-50 V voltage drop plus one or more CV controlled outputs for powering logic, USB, and audio that should satisfy a strict regulation accuracy requirement for each output.

It is appreciated that in the following description and example drawings, the concept of independently controlled CC/CV multi-outputs is illustrated mostly with series couplings of the secondary windings on the energy transfer element (e.g., transformer). However, it should not be considered as a limitation and it is appreciated that based on the application and the load power requirement on each of multiple outputs, the independently regulated CV/CC outputs may be arranged in any coupling combination of series windings, parallel windings, or both series windings and parallel windings with a common return line for all of the independently controlled and regulated outputs in accordance with the teachings of the present invention.

FIG. 1 shows the general structure and circuit blocks of an example power converter with a single magnetic component, and multiple independently regulated outputs, which in one example may be coupled to independent loads, each of which may require a regulated constant current or constant voltage for operation in accordance with the teachings of the present invention.

In FIG. 1 the ac line voltage VAC 105 through an input rectifier and input circuitry (e.g., filter and protection components) generates the input voltage Vin 115 to the power converter across a magnetic component 120 that is coupled to a primary switching device 130. Primary switching device 130 is controlled by a primary switching control block 161. The controlled switching between on-state and off-states of the primary switching device 130 may transfer power pulses from primary winding 121 coupled to the input of power converter to the multiple secondary windings 122, 123 and 124 with possible extended number of secondary windings. Secondary windings 122, 123 and 124 are all wound on the same magnetic core as the primary winding 121 and are electrically and magnetically coupled together generating multiple secondary outputs (ports), in one example Sec1 132, Sec2 133 and up to Sec(n) 134. Although the multiple secondary windings 122, 123 and 124 is illustrated in the single magnetic component 120 as series coupled windings, it is appreciated that in other examples, the multiple secondary windings 122, 123, and 124 may be coupled in any combination of series windings, parallel windings, or a combination of both series windings and parallel windings for all of the independently controlled and regulated outputs. Multiple secondary controlled switching devices 140 through individual switches SW1 142, SW2 143 and up to SW(n) 144 may selectively control transfer of power pulses from primary winding 121 to each of multiple regulated outputs that are demanding for more power.

The synchronous rectifier switch (SR) 145 on the return line 135/155 is controlled through a secondary SR control block 162 that synchronizes switching actions of primary switching device 130 with the synchronous rectifier switch SR 145 on secondary side. In the depicted example, one SR switch 145 is illustrated as being coupled to the common return line return line 135/155. In other examples, it is appreciated that multiple synchronous rectifier switches may be coupled to some or all of the return lines of the output windings. The secondary SR control block 162 SR feedback control signals 166 from the secondary side of power converter and generates control signals 167 to synchronize switching of synchronous rectifier SR switch 145 with the primary switching device 130. In one example (e.g., flyback topology of power converter) when primary switching device 130 is turned on, the synchronous rectifier switch SR 145 remains at off state to prevent transfer of energy to the secondary side and let energy be stored in the magnetic component. When primary switching device 130 turns off, synchronous rectifier switch SR 145 switches to on-state so that the stored energy in the magnetic component generates a power pulse that based on the selected states of the controlled switching devices may be transferred to the output loads demanding for more power. Load block 150, which may include multiple regulated and independently controlled constant voltage CV loads, constant current CC loads, or both constant voltage CV loads and constant current CC loads (e.g., Load1, Load2 and up to Load(n)), receives rectified dc output voltages $V_{O1}$ 152, $V_{O2}$ 153 and up to $V_{O(n)}$ 154 in reference to a single common return line RTN 155 for all of the independently controlled and regulated outputs.

The rectification of output voltages and selective transfer of power pulses from input to each individual output of the power converter is performed by controlled switches in the block of secondary switching devices 140. The multi-output control block 163 by receiving multi-output feedback signals 168 from each output generates multi-output control signals 169 and controls independent regulation of each load in the multi-load block 150. In an isolated converter topology, such as isolated flyback that primary and secondary control signals are referenced to different ground levels the primary switching control block 161 should have galvanic isolation from the secondary SR control block 162. In one example the required communication between primary switching control block 161 and secondary SR control block 162 may be provided through an isolated communication link 165. The multi-output control block 163 and the secondary SR control block 162 may directly exchange control signals 170 to check status of switching devices and to request power pulses from primary switching device. In one example the three control blocks of primary switching control 161, secondary SR control 162 and multi-output control 163 could be included in one single package IC controller 160.

Figure 2A:
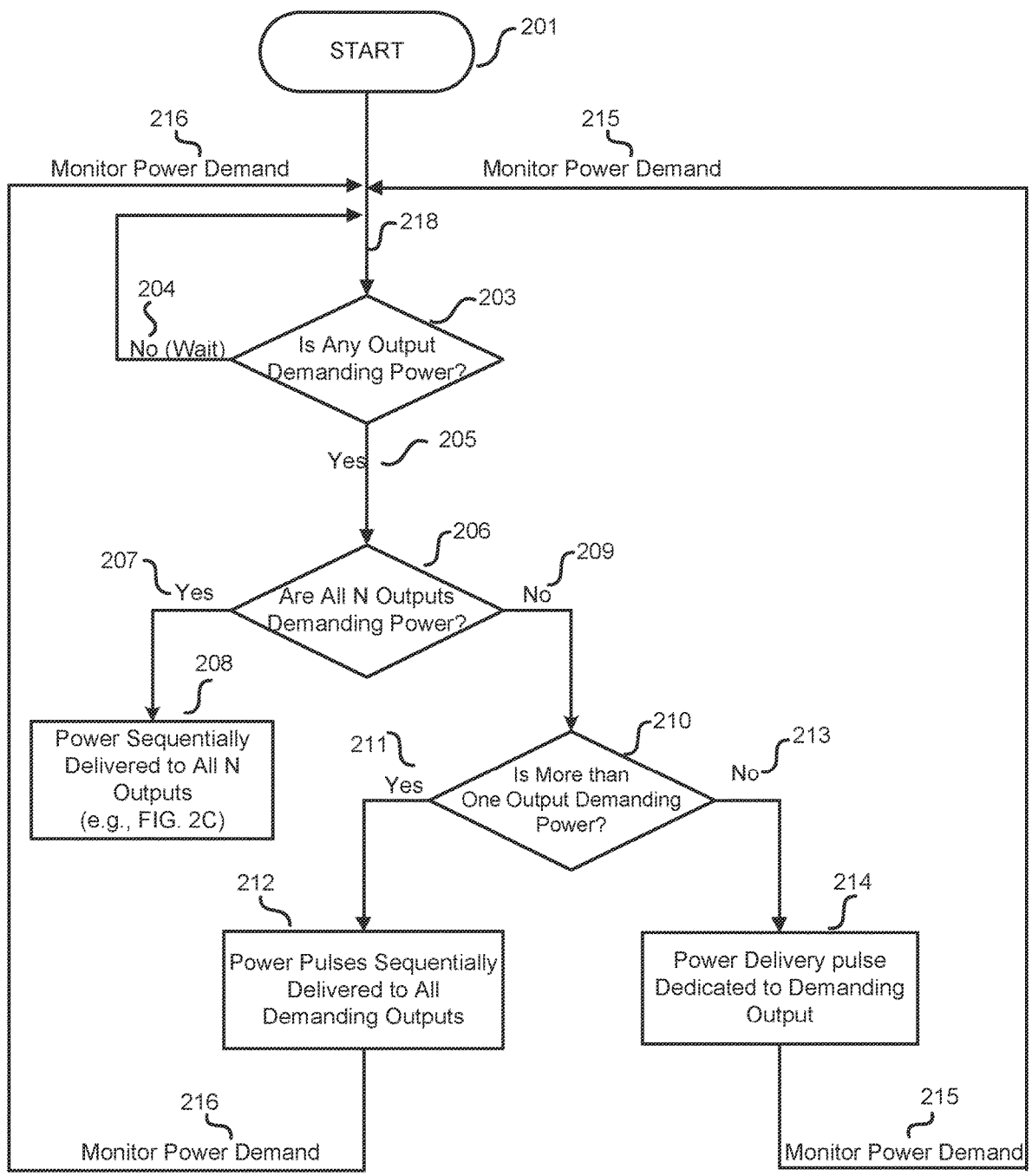
FIGS. 2A, 2B, 2C show the sequential management of primary and secondary switching for transfer of power pulses from primary to secondary outputs based on their demand.
Figures 2B, 2C:
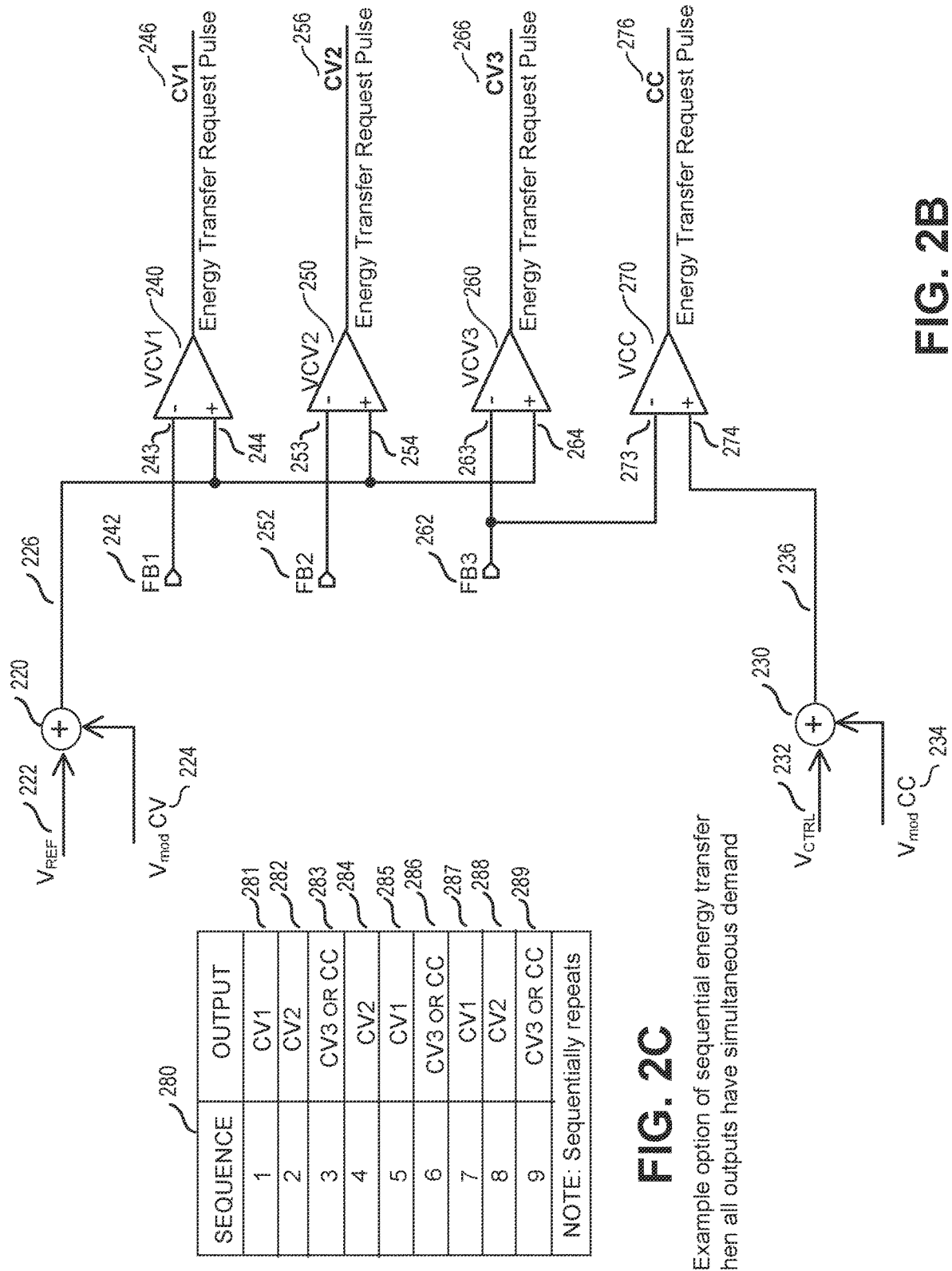

FIGS. 2A, 2B, and 2C show the sequential management of primary and secondary switching for transfer of power pulses from primary to secondary outputs based on each load demand.

FIG. 2A shows a general flow chart for sequential power delivery to N possible outputs based on their load demand. From start point 201 via a link 218, the power demand of outputs is monitored. In conditional (i.e., decisional) block 203, it is checked if any output is demanding power. If "No" 204, processing loops back to monitoring link 218. If "Yes" 205, then in conditional block 206 it is checked through the feedback signals if all N outputs are demanding power. If "Yes" 207, or in other words if all outputs are demanding power simultaneously, then in block 208 power pulses are sequentially delivered to all N outputs. One example of the sequencing of multiple outputs demanding power pulse distribution is introduced in FIG. 2C.

In option "No" 209, if a limited number of outputs are demanding power, then in conditional (i.e., decisional) block 210, it is decided if more than one output is requesting (or demanding) power. In option "No" 213, when only one output is demanding power, then in block 214 it is decided to dedicate all power delivery pulses to the demanding output until its feedback increases above the reference threshold. On the other hand, if still more than one output is demanding power, or option "Yes" 211, then in block 212 power pulses are sequentially delivered to all outputs which have simultaneous demand of power. This process of checking on all output feedback signals for their demand of power would go back to start link 218 to be repeated regularly via the "monitor power demand" links 215 and 216 to provide a fast and fair regulation of all outputs.

FIG. 2B shows a simple logic diagram of the feedback error detection to enable an energy (i.e., power) transfer request pulse from each output. The example of FIG. 2B is illustrated for a power converter with two regulated CV outputs and a third output, which could optionally be selected for a constant voltage CV or constant current CC load wherein the CC control has a different reference with extra control features for the CC load.

In FIG. 2B the three voltage comparators VCV1 240, VC2 250 and VC3 260 receive feedback signals FB1 242, FB2 252 and FB3 262 on their negative terminals 243, 253 and 263 respectively. The three feedback signals FB1 242, FB2 252 and FB3 262 represent three independently controlled and regulated CV outputs. These signals are scaled with different transfer ratios so that they could be compared to a single modified threshold reference signal 226 which is applied to the positive input terminals 244, 254 and 264 of the voltage comparators VCV1 240, VCV2 250 and VCV3 260 respectively. The reference signal 226 is generated from a reference voltage $V_{REF}$ 221 that is modified (or compensated) by adding a CV modifier signal $V_{mod}$CV 224 through an adder 220.

Whenever the feedback signal from a CV output drops below the threshold reference signal 226 the output signal (either CV1 246, CV2 256 or CV3 266) of the associated CV comparator would go high to enable the energy transfer request pulse for that specific power demanding output.

In example of FIG. 2B there is an output option for a constant current CC load that is represented by a fourth comparator VCC 270, which may replace comparator VCV3 260 in the case a constant current CC load is replacing in the third constant voltage CV output. In this case, feedback terminal FB3 262 is coupled to negative input 273 of the VCC comparator 270 and the positive input 274 of the VCC comparator 270 would be coupled to a threshold reference that is generated by adding a CC modifier signal $V_{mod}$CC 234 to the control reference voltage through an adder 230.

FIG. 2C introduces a table 280 for a power pulse delivery sequencing option for a power converter with three independently regulated output control logic as presented in block diagram of FIG. 2B. It shows power pulse distribution when all outputs have simultaneous demand of power. Such sequencing manages an adequate distribution of power pulses for a fast optimum regulation of all the outputs. The left Column in table 280 of FIG. 2C presents the sequences between intervals of power transfer pulses, which repeats until the power demand of the multi-outputs changes.

At first row 281, sequence 1, the constant voltage output CV1 receives a power pulse delivery. At second row 282, sequence 2, the constant voltage output CV2 receives a power pulse delivery. At third row 283, sequence 3, either the constant voltage output CV3 or in the case of a constant current load the constant current output CC would receive the power pulse delivery. At next row 284, sequence 4, for an easier transition the power pulse goes back to the constant voltage output CV2 and in sequence 5, row 5 285, power pulse is delivered to output CV1 before returning in the sequence 6 back to deliver a power pulse to the optional CV3 or CC output in row 286. The same pattern of power pulse delivery will continue in the next sequences (row 7 287, row 8, 288 and row 9 289).

Figure 3:
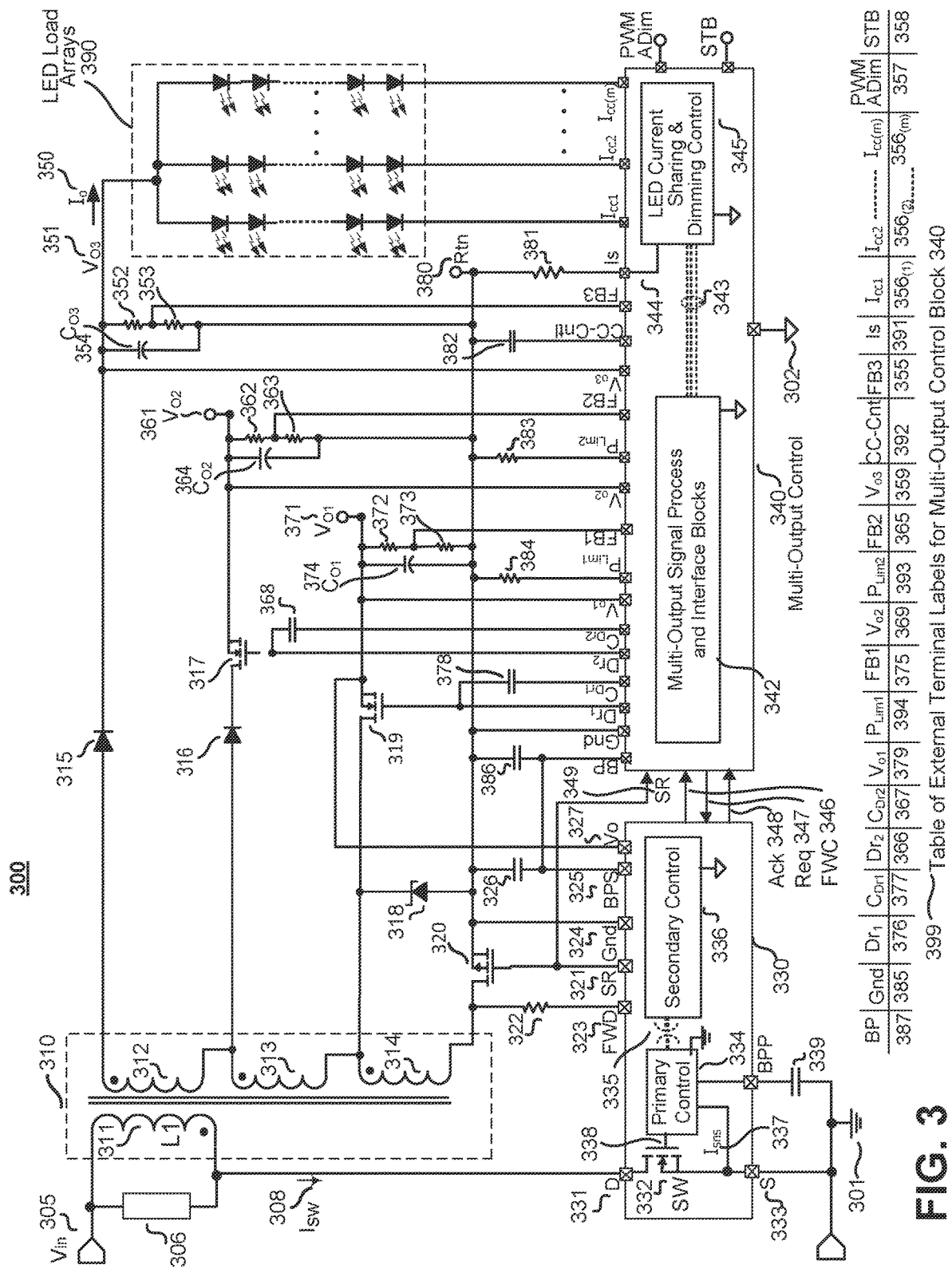
FIG. 3 shows an example schematic of a multi-output power converter with single magnetic and independent regulation of CV/CC outputs.

FIG. 3 shows an example of a multi-output power converter 300 operating as a flyback converter with flyback transformer 310 as the energy transfer element coupled to switching element SW 332. The flyback configuration of FIG. 3 is coupled to an input voltage Vin 305 (from ac line and input rectifier), which is applied across primary winding L1 311 of the transformer (single magnetic component) 310 in series with a switching device SW 332. The multi-output windings 312, 313 and 314 on the same magnetic core are electrically coupled together in series and with galvanic isolation are magnetically coupled to the input winding 311. The example of multi-output power converter in FIG. 3 has two independently controlled constant voltage CV outputs with regulated voltages $V_{O1}$ 371 and $V_{o2}$ 361 and a constant current CC output providing regulated current $I_{o3}$ 350 to a constant current load (in one example such as LED load strings 390) with a voltage drop Vo3 350.

The first CV output Vo1 371 is coupled through a first power pulse transfer switch 319 to the secondary winding 314. The second CV output $V_{O2}$ 361 is coupled through a second power pulse transfer switch 317 and a diode 316 to the secondary winding 313. The third output of power converter 300 in example of FIG. 3 is illustrated as a CC output with regulated current 103 350 and load dependent voltage drop $V_{O3}$ 351 and is coupled through a rectifier diode 315 to secondary winding 312. For all three secondary outputs the return current path is through return line Rtn 380 which is coupled through a synchronous rectifier MOSFET switch 320 to the low potential side of secondary winding 314. It is appreciated that first CV output $V_{o1}$ 371 receives voltage across secondary winding 314. Second CV output $V_{O2}$ 361 receives the voltage across secondary windings 313 plus 314 and the voltage for the CC output $V_{O3}$ 351 would be in relation to the total voltage across all three secondary windings 312 plus 313 plus 314. In the design of multi-secondary winding transformer 310, the appropriate turn ratios for combination and adding up of all outputs should be considered.

In a multi-output power converter, contrary to a single output flyback converter, when the primary switch is conducting and all switches on the secondary side are off, there is no conduction path defining the voltage on the secondary side of the transformer. Based on the primary to secondary turns ratio of the transformer and the primary side input voltage, voltages on the secondary connections of the transformer may go high. Without zener diode 318 (and body diode of MOSFET 319), the voltage would depend on parasitic capacitances and could vary from design to design. The clamping zener diode 318 together with the body diode of MOSFET 319, determines the voltage on drain of MOSFET 319 when the primary switch is turned on. The zener diode 318 prevents excessive voltage stress on the secondary components. The total control of the multi-output power converter 300 consists of a primary control block 334 to control switching of primary power switch 332 through switching signal 338 in response to switch current $I_{sw}$ 308 entering drain 331 of power switch 332. Switch current $I_{sw}$ 308 may be sensed ($I_{sns}$ 337) across source 333 of power switch 332. Capacitor 339 is coupled across a primary supply terminal BPP of primary control 334 in reference to primary ground 301.

The secondary control block 336 may control and synchronize the switching of the synchronous rectifier SR 320 and regulate the output for a single output design (i.e., a non-multi-output design). Due to isolation between primary and secondary windings and the isolated primary and secondary reference grounds 301 and 302, the primary control 334 and secondary control 336 have galvanic isolation and may only communicate optically or magnetically (e.g., through isolation link 335) to synchronize the switching of the primary SW 332 and secondary SR 320 switches. In one example, the drain of SR switch 320 is coupled to the low potential side of the output winding 314, the return line for all the multiple outputs and through a resistor 322 coupled to a forward (FWD) pin on the secondary control block 336 to detect the turn-off instant of the primary power switch 332. The gating/control signal for the SR switch 320 is referenced to source terminal of SR switch 320 which is coupled to the secondary ground terminal Gnd 324. Supply voltage to secondary control block 336 is across terminal BPS 325 and across capacitor 326 referenced to return ground 380. The secondary supply as well as the supply BP 387 across capacitor 386 to the multi-output control block 340 are provided from one of the multi-outputs. During start up when Vol is not rising fast enough, the control supply may be taken from other outputs with higher voltage levels.

The multi-output control 340 may include block 342 "Multi-output signal process and interface blocks" and block 345 "LED Current Sharing and dimming control" which are linked through signals 343. Terminals on multi-output control 340 are listed in Table 399 "Table of External Terminal Labels for Multi-Output Control Block". In one example (number and nature of terminals not limited to this example) these terminals on multi-output control 340 may include:

| | |
|---|---|
| BP, 387 | Supply voltage provided from one of outputs |
| Gnd, 385 | Secondary ground |
| $Dr_1$, 376 | Drive signal for power pulse switch on first CV output $V_{O1}$ |
| $C_{Dr1}$, 377 | Capacitive coupling to control terminal of pulse switch on first CV output $V_{O1}$ |
| $Dr_2$, 366 | Drive signal for power pulse switch on second CV output $V_{O2}$ |
| $C_{Dr2}$, 367 | Capacitive coupling to control terminal of pulse switch on second CV output $V_{O2}$ |
| $V_{O1}$, 379 | First CV output of power converter |
| $P_{Lim1}$, 394 | Power limit/threshold terminal for first CV output |
| FB1, 375 | Feedback terminal from first CV terminal |
| $V_{O2}$, 369 | Second CV output of power converter |
| $P_{Lim2}$, 369 | Power limit/threshold terminal for second CV output |
| FB2, 365 | Feedback terminal from second CV terminal |
| $V_{o3}$, 359 | Third output of power converter that could be regulated as CV or CC |
| Cntl, 392 | Control signal for CC output |
| FB3, 355 | Feedback terminal from third CV terminal |
| Is, 391 | CC output (LED load) current sense through current sharing block 345 |
| $I_{cc1}$, $356_{(1)}$ | Current sense and voltage drop evaluation for first string of LED load |
| $I_{cc2}$, $356_{(2)}$ | Current sense and voltage drop evaluation for second string of LED load |
| $I_{cc(m)}$, $356_{(m)}$ | Current sense and voltage drop evaluation for $n^{th}$ string of LED load |
| PWM/ADim, 357 | Digital (PWM) or analog dimming signal for LED load strings |
| STB, 358 | Standby enable terminal |

It is appreciated that in an example in which only one LED string is used at the CC output, all the input terminals for string currents on multi-output control block ($I_{cc1}$, $I_{cc2}$, ... $I_{cc(m)}$) could be shorted together.

In one example, the feedback signal FB1 for the first CV output $V_{O1}$ 371 is provided through a resistive divider 372 and 373 across output capacitor $C_{O1}$ 374. The feedback signal FB2 for the second CV output Vol 361 is provided through a resistive divider 362 and 363 across output capacitor $C_{O2}$ 364, and similarly the feedback signal FB3 for the third CC output $V_{O3}$ 351 is provided through a resistive divider 352 and 353 across output capacitor $C_{O3}$ 354.

An external capacitor 378 is applied from terminal $C_{Dr1}$ 377 to the control terminal of the first power pulse switch 319 on the first CV output $V_{O1}$ 371. Similarly, another external capacitor 368 is applied from terminal $C_{Dr2}$ 367 to control terminal of the second power pulse switch 317 on the second CV output $V_{O2}$ 361.

The power limit for first CV output $V_{O1}$ 371 is defined by an external resistance 384 from terminal $P_{Lim1}$ 394 to the return ground Rtn 380. Similarly, the power limit for second CV output $V_{O2}$ 361 is defined by another external resistance 383 from terminal $P_{Lim2}$ 383 to the return ground Rtn 380. The constant current terminal CC-Cntrl 392 is also defined through an external capacitor 382 coupled to return ground Rtn 380.

In one example, primary control 334 and secondary control 336 blocks are integrated and packaged in a single IC controlling an external power switch 332. In another example to simplify design, the power switch 332 is also packaged in the same IC as the primary control 334 and secondary control 336. In yet another example, power switch 332, primary control 334, secondary control 336 as well as the multi-output control are all included in a single IC.

In summary, a control scheme for a single magnetic multiple output CC/CV converter in accordance with the teachings of the present invention is implemented through three well synchronized control sections with correlated functions:

The primary controller for the primary power switch on-off control which has a Ramp Time Modulation (RTM) built-in engine with peak-current control. On reception of a pulse from the secondary control block through an isolation link (e.g., a magnetic link), the primary will immediately issue a pulse. The peak current is determined by the RTM engine.

The secondary side controller drives the SR MOSFET and produces demand pulses to the primary switch control.

The multi-output control block for current/voltage regulation that regulates the output quantity on each multi-output by dedicating power pulses based on each output loading and power demand. It also includes a current sharing block that controls current in multiple LED strings and the total current by regulating the voltage drop over a sense current resistor. This block may also assure that the currents in all strings are equal.

Figure 4:
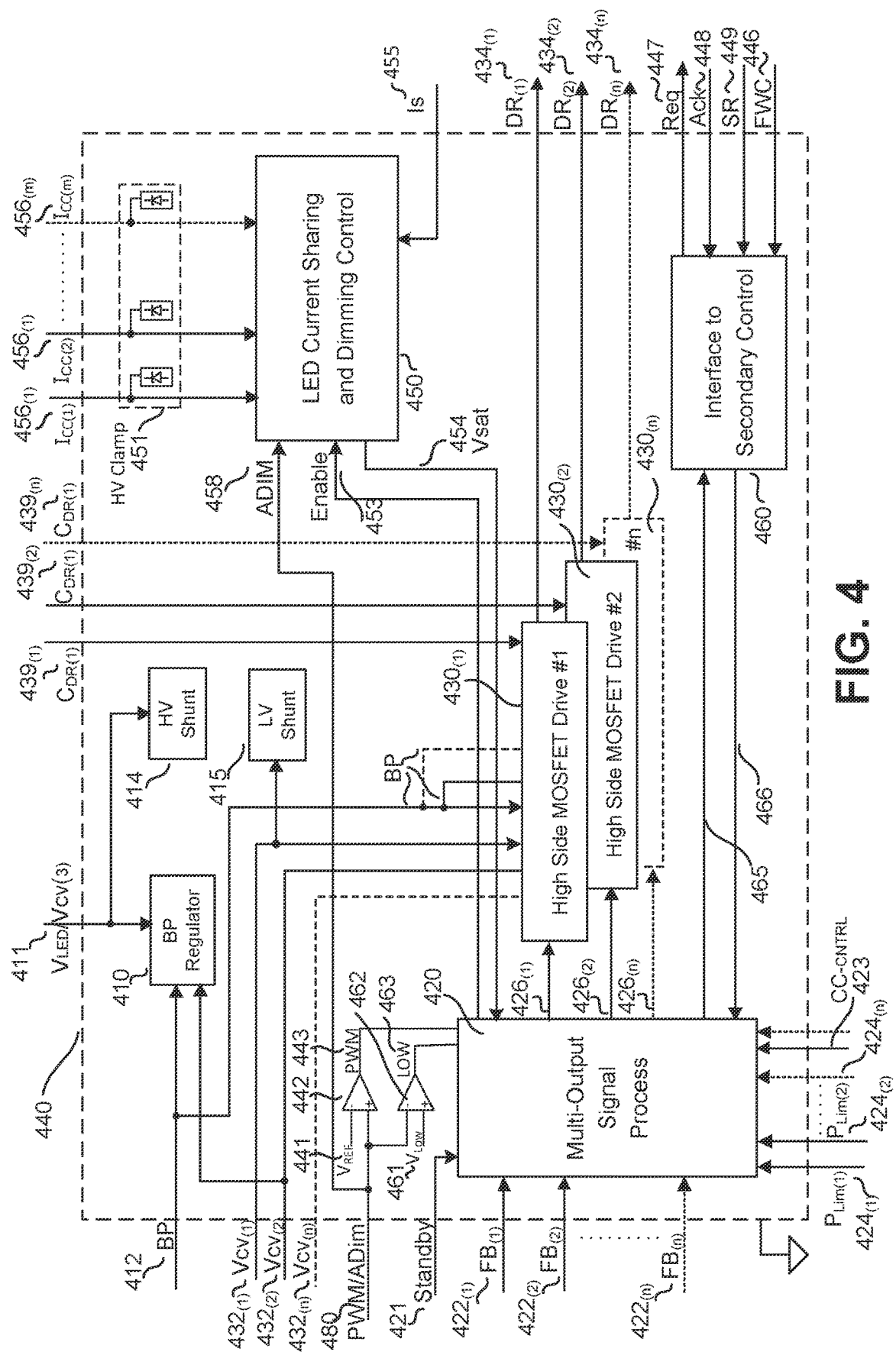
FIG. 4 shows internal blocks of the multi-output control block for independent regulation of CV/CC outputs and current sharing in multiple LED strings at CC output.

Detailed examples of internal blocks and terminals of the multi-output control block for multi-output CV and CC independent regulation in a multi-output power converter with single magnetic component are described in FIG. 4.

FIG. 4 shows an example of internal functional blocks and control signals of the multi-output control block 163 in FIG. 1, or 340 in FIG. 3. As illustrated, feedback signals $FB_{(1)}$ $422_{(1)}$, $FB_{(2)}$ $423_{(2)}$, . . . to $FB_{(n)}$ $422_{(n)}$ from all CV outputs, as well as the power limit threshold signals $P_{Lim(1)}$ $424_{(1)}$, $P_{Lim(2)}$ $424_{(2)}$, . . . to $424_{(n)}$ are received by multi-output signal process block 420. The feedback/control signal(s) for the constant current output(s), if applicable, is illustrated by CC-$_{CNTRL}$ signal(s) 423. The multi-output signal process block 420, based on power demand and FB information received from each output, sends signals $426_{(1)}$, $426_{(2)}$, . . . to $426_{(n)}$ to the driver blocks High Side MOSFET Drive #1 $430_{(1)}$, High Side MOSFET Drive #2 $430_{(2)}$, . . . to High Side MOSFET Drive #n $430(n)$, respectively. These driver blocks also receive supply voltage BP 412 and the respective output CV voltages $V_{CV(1)}$ $432_{(1)}$, $V_{CV(2)}$ $432_{(2)}$, . . . to $V_{CV(n)}$ $432_{(n)}$ to generate drive signals $DR_{(1)}$ $434_{(1)}$, $DR_{(2)}$ $434_{(2)}$, to $DR_{(n)}$ $434_{(n)}$ to control power pulse switches on each multi-output.

The BP regulator 410 regulates voltage on the BP terminal 412. In normal operation, BP regulator 410 uses one of the multi-outputs (e.g., $V_{CV(2)}$ $432_{(2)}$) as a primary source. However, when this output is low (e.g., during start up) it may use other outputs (e.g., $V_{VCV(3)}$ or $V_{LED}$ 411). The BP regulator should provide sufficient power for both the multi-output control block plus the secondary control block.

The high voltage HV shunt 414 and low voltage LV shunt 415 may be required to limit voltage on some CV output terminals that could be subject to peak-charging. In example of FIG. 4, HV shunt 414 is used to limit voltage on $V_{CV3}/V_{LED}$ terminal to the maximum allowed and LV shunt 415 is used to limit voltage on $V_{CV(1)}$ terminal.

The level of signal on terminal PWM/ADim 480 could determine or distinguish between an analog or digital dimming option of the LED strings. If signal level PWM/ADim 480 is above $V_{REF}$ 441, the output signal of comparator 442, which is PWM signal 443, goes high and through multi-output signal process block 420 selects digital dimming. Otherwise, the ADim signal 458 through the control block 450, which is LED current sharing and dimming control, selects the analog dimming for LED strings. Comparator 462 detects a low level of PWM/ADim signal in comparison to $V_{Low}$ threshold 461 to generate signal LOW 463 to the multi-output signal process block 420. The multi-output signal process block 420 also requires transferring signals enable 453 and Vsat 454 to and from LED current sharing and dimming control block 450. As well, signals 465 and 466 are transferred to and from the block 460, which is the interface to secondary control (block 336, FIG. 3). The essential signals to be sent to and received from secondary control (block 336, FIG. 3) may include:

1) A forward control (FWC) signal 446 from secondary control (346 in FIG. 3, which is the FWD terminal information on secondary MOSFET SR drain providing the turn on and off instant of the primary power switch).
2) Req signal 447 to secondary control (347 in FIG. 3, which is the power pulse request from a CV or CC output).
3) Acknowledge signal Ack 448 from secondary control (348 in FIG. 3 to acknowledge the request of a power pulse).
4) The drive signal of synchronous rectifier MOSFET primary 320, synchronous rectifier (SR) signal 449 (349 in FIG. 3 from secondary control terminal SR 321) is also received by multi-output control through interface block 460.

Figure 5:
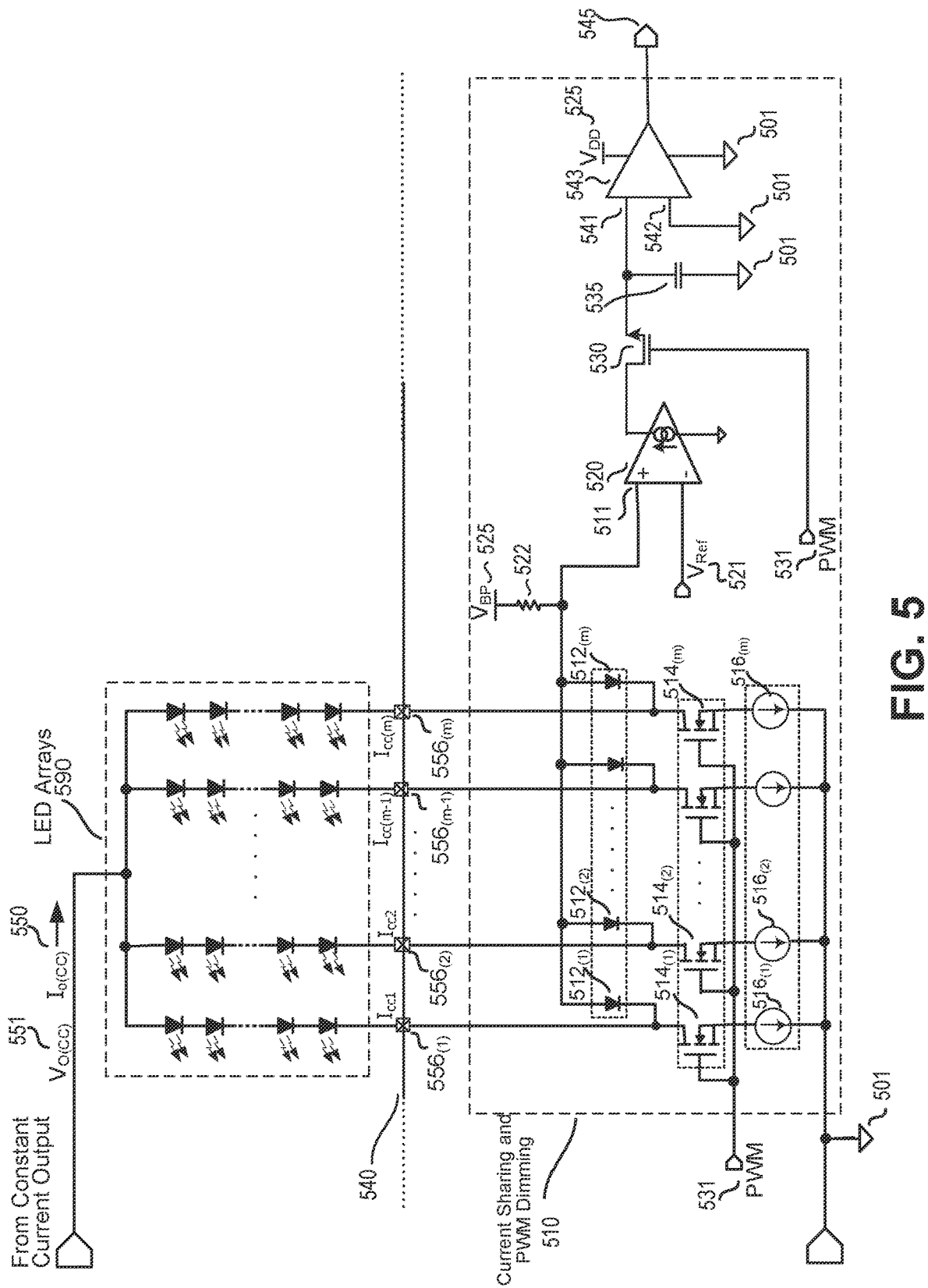
FIG. 5 is an example circuit for current sharing and control of multiple LED strings at CC output.

The LED current sharing and dimming control block 450 is responsible to receive current from all individual LED strings to process as illustrated in example of FIG. 5. Current from each LED string: $I_{CC(1)}$ $456_{(1)}$, $I_{CC(2)}$ $456_{(2)}$, . . . to $I_{CC(m)}$ $456_{(m)}$ as well as the total sensed current of LED strings, Is 455, are received and processed in the LED current sharing and dimming control block 450 (in FIG. 3, each LED string current, $I_{CC(1)}$ up to $I_{CC(m)}$ and voltage drop signal of Is on resistor 381). The HV clamp module 451 may clamp any possible HV condition on the LED string current terminals ($I_{CC}$ terminals). In one example, the current sharing and dimming control block 450 regulates the voltage on anodes of the LED strings in order to provide sufficient voltage over the current sources to accurately control the current in the LED strings. It is appreciated that to avoid clutter, the non-major functions of the multi-output control block 440, which are required for fault detections and protections are not shown in example of FIG. 4.

In one embodiment of the multi-output power converter, the CC output may be used for current regulated strings of LED load that in one example is utilized in TV or PC monitors. The current sharing and dimming function for multiple paralleled strings of LEDs is provided by control block LED current sharing and dimming control 450 in FIG. 4, or 345 in FIG. 3. There are multiple choices for current sharing in LED strings, and in one example regulation may be performed in response to the LED string with the minimum voltage of the LED strings (not falling below the marginal level). The dimming function of the LEDs (an example application of which may be in monitors to adjust brightness of the screen), may be performed with analog dimming proportional to a linear current command, or with digital PWM dimming (in range of 100 Hz to few ten kHz) in comparison to the switching frequency (in range of 50 kHz to few hundred kHz). The digital PWM dimming may utilize in-phase PWM pulses, or may use phase-shifted PWM pulses (see, e.g., in FIG. 6) by a sample and hold process of current in each string to detect minimum voltage drop in the string. In phase-shifted PWM dimming, improved visual performance and increased time-distributed power demand for the LED load is achieved. This will reduce audible noise and improve efficiency. One example of LED current sharing and dimming control in the multi-output control (450 in FIG. 4, or 345 in FIG. 3) is presented in FIG. 5.

FIG. 5 shows an example circuit block diagram for implementation of current sharing (parallel current distribution) at a constant current output with regulated current $I_{O(CC)}$ 550 and voltage $V_{O(CC)}$ 551 across the multi paralleled LED strings 590 (index 1, . . . m) that in one example may be used in a TV or monitor screen backlight. Each LED string as a current source is coupled to an input terminal, $I_{CC1}$ 556$_{(1)}$, $I_{CC2}$ 556$_{(2)}$, . . . $I_{CC(m)}$, 556$_{(m)}$ of the LED current sharing and PWM dimming control block 510 in the multi-output control block 540 (e.g., 340 of FIG. 3, or 440 of FIG. 4). It is appreciated that in other examples of dimming implementation, an analog linear dimming signal may be utilized. The currents of strings with index 1, 2, . . . , m are presented by current sources 516$_{(1)}$, 516$_{(2)}$, . . . 516$_{(m)}$ coupled respectively to each string, and may conduct through a respective PWM switch 514$_{(1)}$, 514$_{(2)}$, . . . 514$_{(m)}$, which are all simultaneously controlled to turn on by PWM pulse 511.

In FIG. 5, one embodiment of present invention, for a simple implementation with a single source of PWM signal, all the multiple channels of LED strings are activated to turn-on simultaneously and in-phase. However, the in-phase control of all LED strings due to lower PWM frequencies (few ten kHz) may cause undesirable shimmer/flicker. An alternative option is a phase shifted PWM signal for each of the multiple channels of LED strings, which is presented in FIG. 6.

The example regulation loop in FIG. 5 may be used for controlling the output voltage of CC output on LED strings. The CC output voltage ($V_{O3}$ 351 in FIG. 3) is regulated by minimizing the voltage drop over the current sources. This configuration may allow a higher PWM frequency as the current sources 516$_{(1)}$, 516$_{(2)}$, . . . 516$_{(m)}$ will support very short setting times. The voltage drops on current sources 516$_{(1)}$, 516$_{(2)}$, . . . 516$_{(m)}$ during the on-time of the PWM switches 514$_{(1)}$, 514$_{(2)}$, . . . 514$_{(m)}$ may be coupled through forward biased diodes 512$_{(1)}$, 512$_{(2)}$, . . . 512$_{(m)}$ to the positive input 511 of the trans-conductance amplifier 520. During the off-time of the PWM switches 514$_{(1)}$, 514$_{(2)}$, . . . 514$_{(m)}$ and when current sources 516$_{(1)}$, 516$_{(2)}$, . . . 516$_{(m)}$ are not conducting, the positive input 511 of the amplifier 520 may be pulled up through resistor 522 to the supply voltage $V_{BP}$ 525. Amplifier 520 in FIG. 5 is a voltage controlled current source that may compare the lowest voltage on the current sources to a predetermined $V_{Ref}$ 521. When PWM signal 531 is high and switch 530, the PWM switches 514$_{(1)}$, 514$_{(2)}$, . . . 514$_{(m)}$, and current sources 516$_{(1)}$, 516$_{(2)}$, . . . 516$_{(m)}$ are conducting, the trans-conductance amplifier 520 outputs a current proportional to a voltage difference on its positive input 511 and the $V_{Ref}$ 521 on negative input into the capacitor 535. The voltage on capacitor 535 through buffer amplifier 543 and signal 545 is used as the reference voltage for the feedback signal of the constant current output (FB3 355 in FIG. 3) to regulate in a closed loop the voltage drop on the constant current output $V_{O3}$ 351 in FIG. 3.

Figure 6:
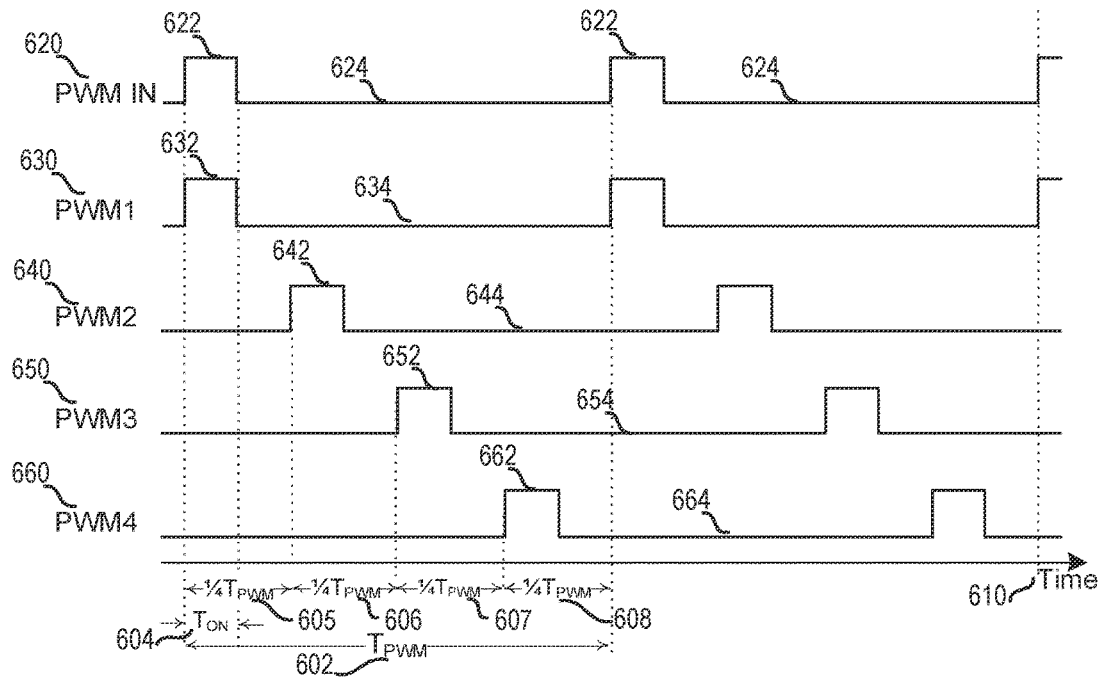
FIG. 6 shows Phase shifted PWM pulses for distributed (phase-shifted) dimming in multiple LED strings in a constant current CC output of a power converter with multi-output CC/CV independent control.

In one example, phase-shifted PWM pulses for multiple paralleled LED strings at the CC output may be used to obtain a more uniform output light of LED strings with reduced shimmer/flicker. In the example, it is achieved by more time-distributed power demand of the LED strings. This reduces audible noise and improve efficiency. FIG. 6 shows an example of phase-shifted digital PWM control pulses for four-channel LED strings with their relative timing on time axis 610 for constant current output load with four-channel phase shifted PWM operation. The top waveform PWM-IN shows the incoming signal, and the PWM1 to PWM4 waveforms show the phase shifted PWM signals for the four current sources. In one example, these waveforms show PWM phase-shifted pulses generated for the digital current control of four strings of LED loads paralleled on the CC output. A low frequency (e.g., few 10 kHz) input PWM, PWM-IN 620 is generated with period $T_{PWM}$ 602, high duration 622 and low duration 624. In one example, the first string of LEDs is controlled by PWM1 630 in which high duration 632 and low duration 634 are in-phase with the input PWM signal (i.e., zero phase-shift). The other three LED strings will be controlled by signals PWM2 640, PWM 650, and PWM4 660, which are symmetrically shifted (or delayed) compared to each other during each PWM period.

In other words, the first LED string would be on during high signal 632. The second LED string would be ON during high signal 642 with ¼ $T_{PWM}$ delay (or shift) from the first string (PWM1 control signal 630). The third LED string goes ON during high signal 652 with ¼ $T_{PWM}$ delay (or shift) from the second string (PWM2 control signal 640), and the fourth string turns on with ¼ $T_{PWM}$ delay (or shift) from the third LED string (PWM3 control signal 650). Even though the PWM frequency is rather low (e.g., 100 Hz to few ten kHz) and the on duration (high signal) is rather short, the four-channel symmetric distribution of PWM control pulses during each PWM period ($T_{PWM}$) results in a uniform distribution of light (e.g., in the backlight application of a monitor or TV).

Figure 7:
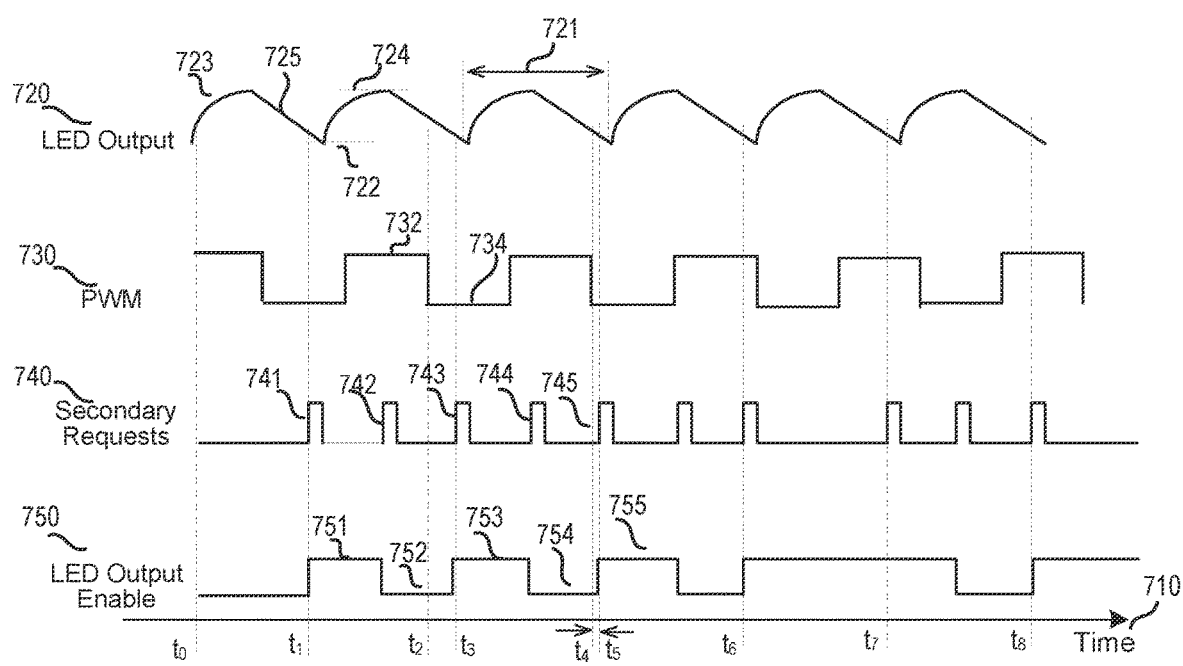
FIG. 7 shows some signal waveforms for a CC output loaded with LED strings in a power converter with multi-output CC/CV independently controlled.

FIG. 7 shows some of the signal waveforms for the constant current output coupling to strings of LEDs with in-phase digital PWM control of current regulation in each string. The horizontal axis 710 is the time, and the vertical axis illustrates some control signals that are presented with their relative timing. The top waveform 720 shows the voltage ripple variation on the constant current CC output on the LED strings (LED output) during normal operation with a fixed LED load. During each ripple period 721, the rising interval 723 indicates power delivery to the CC output, and the falling interval 725 is the discharge duration on the CC output capacitance ($C_{O3}$ 354 in FIG. 3). The peak of rise 724 is defined by the maximum allowed voltage on CC output and the low valley voltage drop, point 722, should remain within a margin above the allowable voltage drop of each LED string.

The second graph PWM 730 shows in-phase PWM pulses for all strings with logic high 732 and logic low 734 may control a simultaneous dimming on all the LED strings.

The third graph 740 shows secondary request pulses (Req 347 in FIG. 3) from the multi-output control block (340 in FIG. 3) to the secondary control block (336 in FIG. 3). These secondary request pulses may be initiated by any one of the multiple CV or CC outputs. The secondary request pulse and power demand from CC output to the LED strings can be distinguished from the LED Output Enable pulse in graph 750 to be on logic high (e.g., 751, 753, or 755) when the secondary request (e.g., 741, 743, or 745) goes high. Some of other request pulses are targeted for the CV outputs. These pulses can be distinguished (e.g., 742, 744, and so on) as the LED output enable pulse is low for these request pulses (e.g., 752, 754, and so on).

Figure 8A:
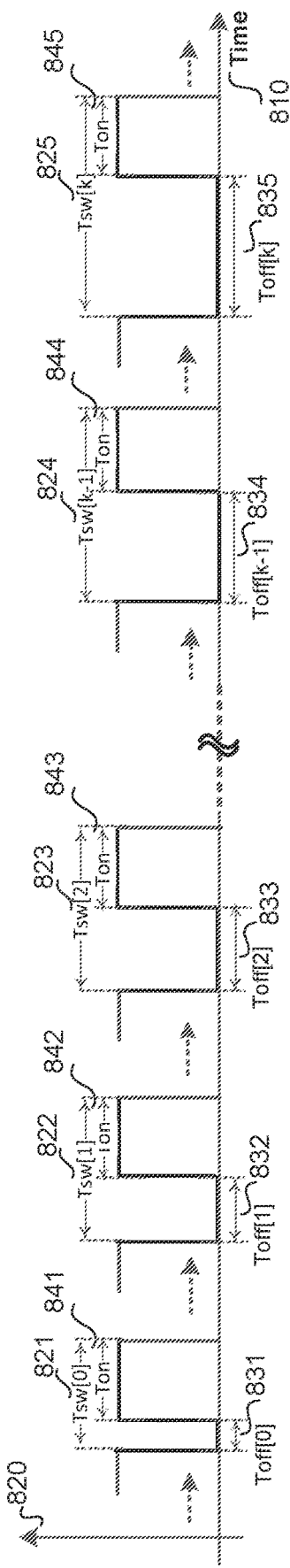
FIGS. 8A and 8B are off-time variations (8A) and the related state changes (8B) in a power converter with multi-output CC/CV independent control according to present application.
Figure 8B:
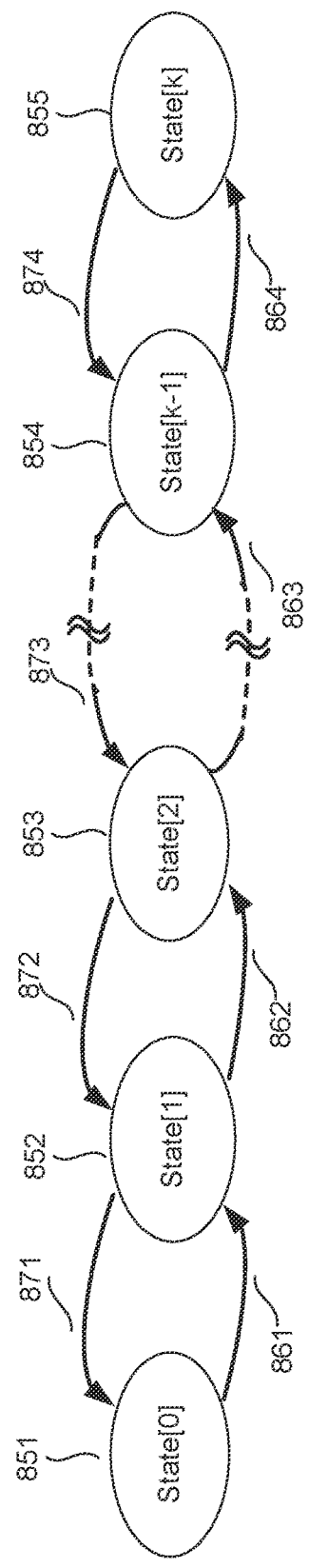

FIGS. 8A and 8B present a very simple trend for an example process of hold-off time changes versus state changes during a gradual load or line change. In FIG. 8A, the horizontal time axis 810 presents an expanded broken time scale for different drive pulses of the primary power switch on the vertical axis 820 for different load or line conditions. Each drive pulse is varying in off-time (and consequently in switching frequency) for a different load or line condition and power converter changes to a different state of operation as illustrated in FIG. 8B. In other words, the amount of time that the primary switch is held off (i.e., the hold-off time) is varied at each state change in response to gradual load or line changes. In one example, the multi-output signal process block (e.g., 420 of FIG. 4) may include digital processing to implement the state changes to vary the hold-off time of the of the primary switch in response to the gradual load or line changes.

It is appreciated that a fixed on-time control may be used where the on-time for all switching drive pulses remains constant in all the states/modes of operation, but the off-time in each state increases by load reduction to increase the switching period and reduce switching frequency when the load varies towards low loads:

$$Ton[0]=Ton[1]=Ton[2]= \ldots =Ton[i]= \ldots =Ton[k-1]=Ton[k]=Ton$$

$$Toff[0]<Toff[1]<Toff[2]< \ldots <Toff[i]< \ldots <Toff[k-1]<Toff[k].$$

Therefore, the on-time, Ton, is fixed for each state from state[0] 851 through state [k] 855. However, the off time, Toff, varies, or increases from state[0] 851 to state[k] 855.

As shown in the example depicted in FIG. 8B, the multi-output signal process block (e.g., 420 of FIG. 4) may traverse through the plurality of states[0-$k$] to change the state of operation from state[0] 851 through link 861 to state[1] 852, and through link 862 to state[2] 853 as the load decreases. Eventually after some more states illustrated by broken link 863, the multi-output signal process block may change the state of operation to state[k−1] 854, and through link 864 to a final state[k] 855 for a minimum load. When the load increases back again from minimum load in state[k] 855 to a maximum load in state[0] 851, the multi-output signal process block may reverse this process through the return links 874, 873, 872, and 871 back to state[0] 851.

In FIG. 8A, as an example of such the required switching frequency variations, the symbolic switching cycles show a fixed on-time Ton (841, 842, 843, 844, and 845) and different/varying off-times Toff[0] 831, Toff[1] 832, Toff[2] 833, . . . Toff[k−1] 834, and Toff[k] 835, resulting in varying periods Tsw[0] 821, Tsw[1] 822, Tsw[2] 823, . . . Tsw[k−1] 824, and Tsw[k] 825, respectively.

Figure 9:
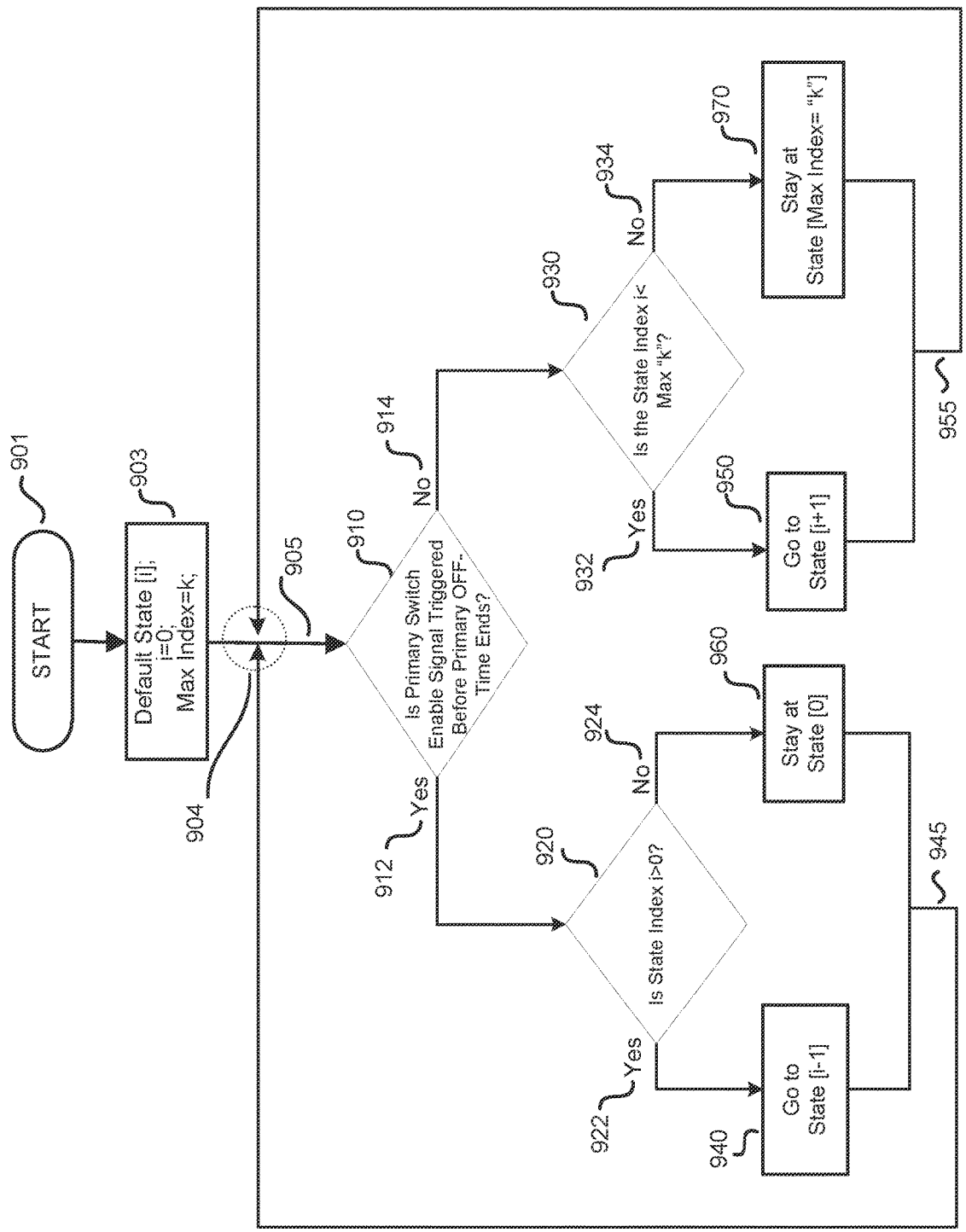
FIG. 9 is a flow chart summarizing the state changes based on a control process according to examples depicted in FIGS. 8A and 8B and based on load condition in a power converter with multi-output CC/CV independent control according to present application.

FIG. 9 shows a simplified flow chart illustrating a process that the multi-output signal process block may perform to adjust the state[i] as described in FIG. 8B to vary the hold-off time selection and provide adaptive regulation during normal operation. As explained above, the CV/CC output regulation module regulates the incoming request/demand of power through the feedback pin of each multi-output processed in a regulation module that provides a single request signal output to the power switch. The selection of the next output to receive the power pulse could be done by an output scheduling control block (e.g., FIGS. 2A and 2B). The hold-off time used for an adaptive regulation during normal operation could be selected for a constant voltage CV output, constant current CC output or could be in a multi-output converter with independently CV or CC regulation of each output.

In a single output converter, an output regulation module (e.g., secondary controller) may regulate the CV or CC output based on the incoming request for (or demand of) power through the FB signal. In a multi-output converter on the other hand, as explained above, there is an extra/third control module of multi-output regulation (e.g., 340 in FIG. 3), that receives the request for, or demand of, power from each output through each FB pin. The FB information may be processed by the related comparator in the multi-output signal process module (e.g., 420 in FIG. 4) to provide a request signal (e.g., Req 447 in FIG. 4) to the secondary control module (e.g., 336 in FIG. 3), which initiates the turn-on command for the primary power switch.

The summarized flow chart in FIG. 9 shows the state changes based on different load conditions. After start point 901 and block 903, the default state[i] may be any state number from a minimum of "0" to a maximum of "k" state steps. The process continues by link 905 to conditional block 910 to verify if the request signal has triggered by the multi-output signal process block before primary off-time has ended. If the off time has ended before enable signal triggering, or option "NO" 914, then in the conditional block 930, it is determined if the state index "i"<Max Index "k". In other words, it is checked whether the state has not yet reached to the maximum state "k". If the answer is "Yes" 932, and the present state is still less than the maximum state k, then the next step would be increasing the state from [i] to [i+1], which increases the hold-off time of the primary switch due to a decreasing load until a minimum load is reached when the index i=k. Otherwise, if answer is "No" 934 and the state is already at the maximum possible state, then block 970 indicates that it would stay at state [Max Index="k"]. Either after increasing/lifting the state to a higher state or staying at maximum state, the loop through link 955 loops back to the starting check point 904 on link 905 and the process repeats.

On the other hand, from conditional block 910, if the request is triggered after the primary off-time ends (link "Yes" 912), then in next conditional block 920 in which it is determined if state index i>0, it is verified if the state index is greater than 0 or not. If the answer is "No" 924 and state is still on 0, then processing stays at state[0] (block 960). If the answer is "Yes" 922 and state index is greater than 0, then in the next step block 940, the state is pulled down from [i] to [i−1], which decreases the hold-off time of the primary switch due to an increasing load until a maximum load is reached when the index i=0. Either after keeping state at 0 (minimum state) or reducing/pulling the state down to a lower state, the loop through link 945 loops back to the starting check point 904 on link 905 and repeats.

In other words, it could be concluded that if the primary switch enable signal triggers before the off-time ends, the operational state should be pulled down towards the minimum state [0]; OR if the primary switch enable signal triggers after the off-time ends, the operational state should be pushed up towards the maximum state [k].

Figure 10:
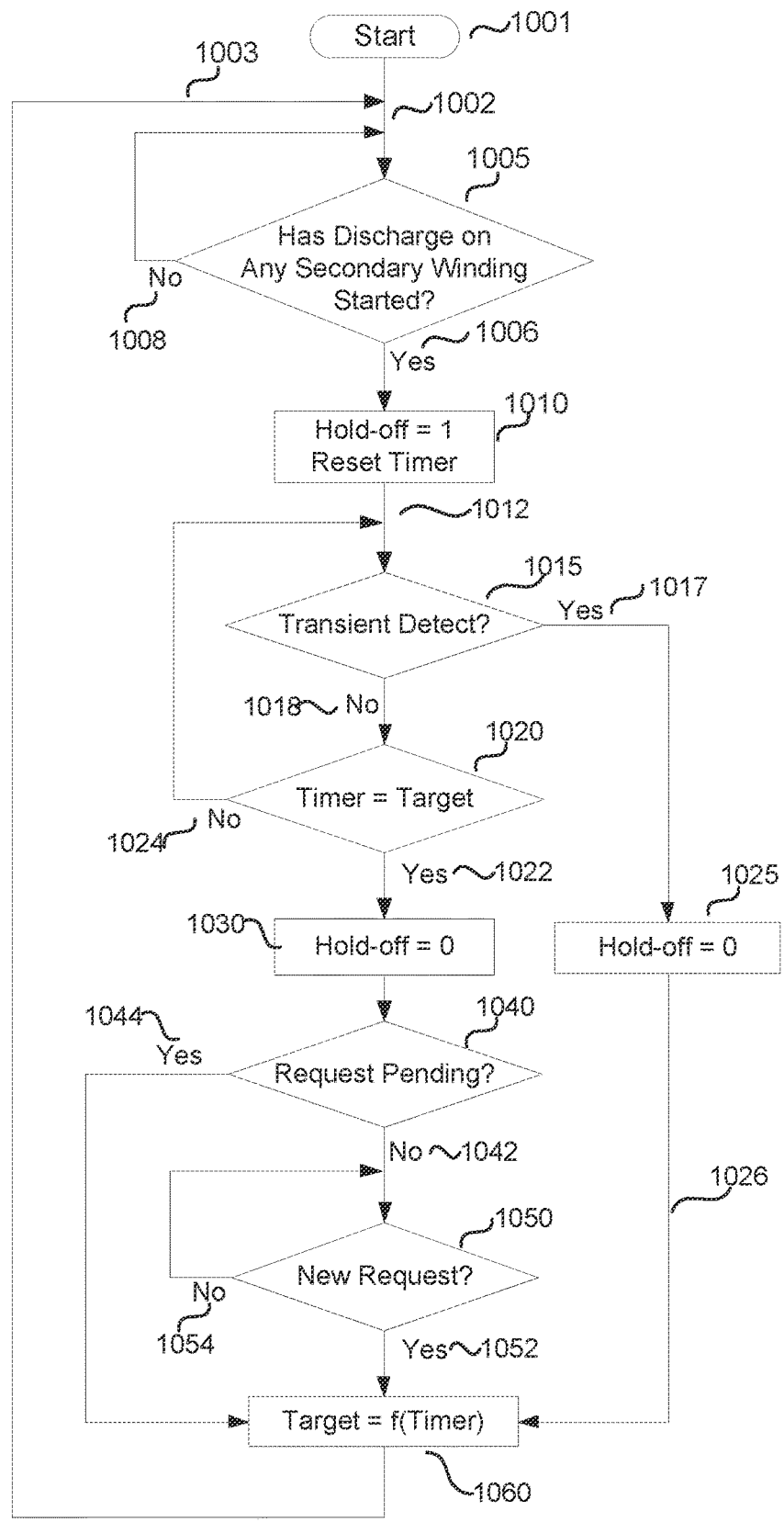
FIG. 10 presents a flow chart summarizing another example process that may be used for state changes based on the load change in a power converter with multi-output CC/CV independent control according to yet another embodiment in accordance with the teachings of the present invention.

FIG. 10, in comparison to FIGS. 8A and 8B and flow chart of FIG. 9, presents a second/another example/embodiment of a digitally controlled hold-off time process control that the multi-output signal process block may perform to vary the hold-off times of the primary switch in response to a load change in any output of a multi-output power converter with independent CC/CV control in accordance with the teachings of the present invention.

At start 1001, and through link 1002, conditional block 1005 determines if the any secondary winding has begun discharging (transferring the energy that was stored in flyback transformer during on-time of primary power switch to the output). For instance, in one example, the start of any secondary winding discharge may be determined by the detection of a discharging condition signal on the FWD terminal (e.g.; 323 in FIG. 3) that in one example is coupled though resistor 322 to the return line of the secondary windings. If no secondary winding discharge has started (No 1008), then processing loops back to start point and waits for a secondary winding discharge to begin. On the other hand, when the a secondary winding discharge has begun (Yes 1006), the hold-off digital signal in block 1010 is set to a logic high (i.e., hold-off=1) and resets a timer. The output 1012 of block 1010 then proceeds to conditional block 1015, which determines if there is a detection of a transient condition (e.g., a detection of a change in the load or line condition). If any change in the load or line has been detected (Yes 1017), then the digital signal of hold-off signal is set to a logic low (i.e., hold-off=0) in block 1025. Then through link 1026 processing continues to the final block 1060, in which a target hold-off time value is set to a first value that is a function of the timer (i.e., Target=f(Timer)), and processing loops back through link 1003 back to start point 1002.

In conditional block 1015, if no change in load is detected (e.g., no transient load condition is detected), then processing continues through No 1018 to conditional block 1020, in which it is checked if the timer has reached the target time value yet. If the timer has not yet reached the target hold-off time value (No 1024), then processing loops back to node 1012, to check again if a change in load is detected in conditional block 1015, and if the timer has reached to the target hold-off time value in conditional block 1020. On the other hand, when the timer value reaches the target hold-off time value (Yes 1022) before a change in load is detected in conditional block 1015, the hold-off time signal is set to zero in the next step, block 1030. Block 1030 is followed by another conditional block 1040 to verify if the previous request is still pending or expired. If the previous request is still pending (Yes 1044) the target hold-off time value is set to a second value that is a function of the timer (i.e., Target=f(Timer)), and processing loops back through link 1003 back to start point 1002.

However, if the previous switching request has been expired and not pending (No 1042), then in conditional block 1050 it is checked if the new request has been received. If new request has not yet been received (No 1054), processing loops back to conditional block 1050 to wait for a new request to be received (Yes 1052) to proceed to the final block 1060 the target hold-off time value is set to a third value that is a function of the timer (i.e., Target=f (Timer)), and processing loops back through link 1003 back to start point 1002.

The above description of illustrated example embodiments, including what is described in the Abstract, are not intended to be exhaustive or to be limitation to the precise forms or structures disclosed. While specific embodiments and examples of the subject matter described herein are for illustrative purposes, various equivalent modifications are possible without departing from the broader spirit and scope of the present invention. Indeed, it is appreciated that the specific example currents, voltages, resistances, device sizes, etc., are provided for explanation purposes and that other values may also be employed in other embodiments and examples in accordance with the teachings of the present invention.

We claim:

1. A control system for use in a power converter having a plurality of outputs, comprising:
   a primary switching control block coupled to control switching of a primary switch coupled to an input of the power converter, wherein the primary switching control block is coupled to control switching of the primary switch to transfer energy pulses from the input of the power converter to the plurality of outputs of the power converter through a single magnetic component;
   a secondary control block coupled to control switching of a synchronous rectifier (SR) switch coupled to a common return line of the plurality of outputs, wherein the secondary control block is coupled to synchronize switching of the SR switch with the turn off of the primary switch; and
   a multi-output control block coupled to control switching of at least one pulse transfer switch that is coupled to one of the plurality of outputs to regulate the plurality of outputs, wherein a request for an energy pulse from one of the plurality of outputs is transferred to the primary switching control block to turn ON the primary switch to transfer the requested energy pulse, wherein the multi-output control block is further coupled to turn ON a respective pulse transfer switch corresponding to the request for the energy pulse from one of the plurality of outputs, the multi-output control block comprising:
      an interface coupled to communicate with the secondary control block to send the request for the energy pulse to the secondary control block and to receive an acknowledge signal from the secondary control block, wherein the acknowledge signal represents a confirmation of receipt of the request for the energy pulse.

2. The control system of claim 1, wherein the interface of the multi-output control block is coupled to receive a synchronous rectifier drive signal and a forward control signal that represents a voltage of a terminal of the SR switch.

3. The control system of claim 1, wherein the multi-output control block is further coupled to control switching of the at least one pulse transfer switch to regulate the plurality of outputs to have constant current outputs, constant voltage outputs, or both constant current outputs and constant voltage outputs.

4. The control system of claim 1, wherein the multi-output control block further comprises:
   a multi-output signal process block coupled to receive a plurality of feedback signals that represent the plurality of outputs and to output the request for the energy pulse in response to at least one of the plurality of feedback signals, wherein the interface is coupled to receive the request for the energy pulse from the multi-output signal process block.

5. The control system of claim 4, wherein the multi-output signal process block is further coupled to control switching of the at least one pulse transfer switch in a sequence in response to at least one of the plurality of feedback signals.

6. The control system of claim 1, wherein the plurality of outputs are referenced from the common return line.

7. The control system of claim 1, wherein one of the plurality of outputs is coupled to a constant current load, the constant current load comprising multiple parallel light emitting diode (LED) strings.

8. The control system of claim 7, wherein the multi-output control block further comprises an LED current sharing and dimming control block coupled to control voltage across the constant current load and the multiple parallel LED strings, wherein the LED current sharing and dimming control block is coupled to regulate a total current in the constant current load and to equalize currents in the multiple parallel LED strings.

9. The control system of claim 1, wherein the primary switching control block is referenced to a primary ground to control the switching of the primary switch.

10. The control system of clam 1, wherein the turn ON of the primary switch is in response to receiving the request for the energy pulse and a turn OFF of the primary switch is in response to a current of the primary switch reaching a peak current limit.

11. The control system of claim 1, wherein the secondary control block is referenced to the common return line.

12. The control system of claim 1, wherein the secondary control block is coupled to communicate the request for an energy pulse to the primary switching control block through a galvanic isolation link.

13. The control system of claim 1, wherein the secondary control block is coupled to turn the SR switch OFF when the primary switch is ON.

14. The control system of claim 1, wherein one of the plurality of outputs is coupled to a constant voltage load.

15. The control system of claim 1, wherein the multi-output control block is coupled to control a hold-off time of the primary switch in response to a load that is coupled to at least one of the plurality of outputs, wherein the hold-off time represents the off-time of the primary switch.

16. The control system of claim 15, wherein the hold-off time increases as the load reduces.

17. The control system of claim 15, wherein a value of the hold-off time increases as a state of the primary switch increases, and the state increases as the load decreases.

18. The control system of claim 1, wherein the primary switching block and the secondary control block are packaged in a single integrated circuit.

19. The control system of claim 18, wherein the multi-output control block is packaged in the single integrated circuit.

20. A controller for use in a power converter having a plurality of outputs, comprising:
a multi-output control block coupled to control switching of at least one pulse transfer switch coupled to one of the plurality of outputs, wherein the multi-output control block is configured to generate a request for an energy pulse for one of the plurality of outputs, wherein the request for the energy pulse is transferred to a primary switching control block and wherein the primary switching control block is coupled to control switching of a primary switch coupled to an input of the power converter to transfer the requested energy pulse from the input to one of the plurality of outputs, the multi-output control block comprising:
a multi-output signal process block coupled to receive a plurality of feedback signals from the plurality of outputs and to output the request for the energy pulse in response to at least one of the plurality of feedback signals dropping below a threshold reference, wherein the multi-output signal process block is coupled to turn ON the pulse transfer switch to transfer the requested energy pulse to the one of the plurality of outputs with the one of the plurality of feedback signals which dropped below the threshold reference.

21. The controller of claim 20, wherein the the multi-output control block is coupled to receive a synchronous rectifier drive signal and a forward control signal that represents a voltage of a terminal of the SR switch.

22. The controller of claim 20, wherein the multi-output control block is further coupled to control switching of the at least one pulse transfer switch to regulate the plurality of outputs to have constant current outputs, constant voltage outputs, or both constant current outputs and constant voltage outputs.

23. The controller of claim 20, wherein the multi-output signal process block is further coupled to control switching of at least one pulse transfer switch in a sequence in response to at least one of the plurality of feedback signals.

24. The controller of claim 20, wherein the plurality of outputs are referenced from a common return line.

25. The controller of claim 20, wherein one of the plurality of outputs is coupled to a constant current load, the constant current load comprising multiple parallel light emitting diode (LED) strings.

26. The controller of claim 25, wherein the multi-output control block further comprises:
an LED current sharing and dimming control block coupled to control voltage across the constant current load, wherein the LED current sharing and dimming control block is coupled to regulate a total current in the constant current load and to equalize currents in the multiple parallel LED strings.

27. The controller of claim 26, wherein the multi-output control block is coupled to control a hold-off time of the primary switch in response to a load that is coupled to at least one of the plurality of outputs, wherein the hold-off time represents the off-time of the primary switch.

28. The controller of claim 27, wherein the hold-off time increases as the load reduces.

* * * * *